United States Patent [19]
Wagner et al.

[11] Patent Number: 5,903,462
[45] Date of Patent: May 11, 1999

[54] COMPUTER IMPLEMENTED METHOD, AND APPARATUS FOR CONTROLLING A HAND-HELD TOOL

[75] Inventors: Kenneth William Wagner, Bethesda, Md.; James Clayton Taylor, San Antonio, Tex.

[73] Assignee: The United States of America as represented by the Administrator of the National Aeronautics and Space Administration, Washington, D.C.

[21] Appl. No.: 08/954,055

[22] Filed: Oct. 17, 1997

Related U.S. Application Data

[60] Provisional application No. 60/028,831, Oct. 17, 1996.

[51] Int. Cl.⁶ .............................. G06F 19/00; H02P 7/28
[52] U.S. Cl. ...................... 364/474.1; 318/490; 340/680
[58] Field of Search ..................... 364/474.1; 318/490, 318/434, 571; 340/680; 433/114; 81/487; 144/48.5, 104; 254/209, 248; 381/31; 137/557

[56] References Cited

U.S. PATENT DOCUMENTS

| | | | |
|---|---|---|---|
| 4,237,408 | 12/1980 | Frecka | 318/571 |
| 4,307,325 | 12/1981 | Saar | 388/907 |
| 4,317,176 | 2/1982 | Saar et al. | 364/474.1 |
| 4,410,846 | 10/1983 | Gerber et al. | 318/490 |
| 4,536,688 | 8/1985 | Roger | 318/490 |
| 4,636,961 | 1/1987 | Bauer | 364/474.1 |
| 4,921,009 | 5/1990 | Adam | 137/557 |
| 5,189,350 | 2/1993 | Mallett | 318/434 |

*Primary Examiner*—Paul P. Gordon
*Assistant Examiner*—Sheela S. Rao
*Attorney, Agent, or Firm*—Eileen A. Lehmann; Guy M. Miller; Keith L. Dixon

[57] ABSTRACT

The invention described here in is a computer-implemented method and apparatus for controlling a hand-held tool. In particular, the control of a hand held tool is for the purpose of controlling the speed of a fastener interface mechanism and the torque applied to fasteners by the fastener interface mechanism of the hand-held tool and monitoring the operating parameters of the tool. The control is embodied in intool software embedded on a processor within the tool which also communicates with remote software. An operator can run the tool, or through the interaction of both software, operate the tool from a remote location, analyze data from a performance history recorded by the tool, and select various torque and speed parameters for each fastener.

20 Claims, 22 Drawing Sheets

First of 2 State diagrams showing the action taken when the heartbeat timer expired in Intool Software Second of 2 State diagrams showing the action taken when the heartbeat timer expired in Intool Software Routine called when the torque sensor has finished converting in Intool Software Main Routine of Remote Software Program subroutines (Program torque settings, program speed settings, program universal settings, etc.) of Remote Software Upload Performance Log Subroutine in Remote Software Exit Subroutine of Remote Software Remote Operation Subroutine of Remote Software

| | Torque SetPoint (LbFt) | Torque Window (LbFt) | Torque Threshold (LbFt) | | Revolutions (Turns/Angle) | Angle Window (degrees) |
|---|---|---|---|---|---|---|
| A1 | 2.0 | ±1.00 | 1.5 | | INFINITE | |
| A2 | 5.0 | ±2.00 | 3.0 | | INFINITE | |
| A3 | 10.0 | ±2.00 | 3.0 | | INFINITE | |
| A4 | 15.0 | ±2.00 | 3.0 | | INFINITE | |
| A5 | 20.0 | ±2.00 | 3.0 | | INFINITE | |
| A6 | 25.0 | ±2.00 | 3.0 | | INFINITE | |
| A7 | 25.5 | ±0.20 | 3.0 | | INFINITE | |
| B1 | 4.0 | ±1.00 | 3.0 | - | 0.50t | |
| B2 | 8.0 | ±1.00 | 3.0 | - | 2.00t | |
| B3 | 12.0 | ±1.00 | 7.5 | ∠ | 10° | ±5 |
| B4 | 16.0 | ±1.00 | 7.5 | ∠ | 30° | ±15 |
| B5 | 15.0 | ±1.00 | 7.5 | ∠ | 180° | ±90 |
| B6 | 14.0 | ±0.50 | 3.0 | | INFINITE | |
| B7 | 11.5 | ±0.50 | 3.0 | | INFINITE | |

Torque/Revolutions Setting Table (with Tool Operations menu open)

Fig. 18

| Tool | Disk | Help | Main |

Load ALL settings from a file
Save ALL settings to a file

SPEED SETTINGS TABLE

RPMs

CCW1   10
CCW2   30
CCW3   60
CW3   60
CW 2   30
CW1   10

Speed Table (with Disk Operation Menu Open)

Fig. 19

TOOL MONITOR

Hybrid Temperature

Fault at 60°C 28.0 °C

Motor Temperature

Fault at 90°C 28.4 °C

Battery Temperature

Breaker at 60°C
Fault at 55°C 28.5 °C

Warning at 0°C

Battery Voltage

NiCd 36.05 V

Warning at 30.00V
Breaker at 28.00V

Maintenance Information

| | |
|---|---|
| Tool On-Time | 00:01:23:20 |
| Last Fault | NOFAULT |
| Total Turns | 035926 |
| Motor Time | 000:18:03:18 |

Press any key to return to main menu.

Tool Monitor Screen

Fig. 20

Fig. 21 Remote Operation Screen

FAULT MESSAGES

| FAULT | FAULT MESSAGE |
|---|---|
| Software | SYSTEM RESET |
| Over Current | OVER CURRENT |
| Over Temperature | OVER TEMP |
| Low Battery Voltage | LO BATRY |
| Low Peak Torque | LO TORQ |
| High Peak Torque | HI TORQ |

Table 1

Fig. 22

COMPUTER IMPLEMENTED METHOD, AND APPARATUS FOR CONTROLLING A HAND-HELD TOOL

CROSS REFERENCES TO RELATED APPLICATIONS

This application claims the benefit of priority under 35 U.S.C. § 119(e) to U.S. Provisional application Ser. No. 60/028,831, filed Oct. 17, 1996. The following documents are incorporated by reference, Product Specification DIDS, PGT Software Product Specification, NASA-DID-P000, V 1.1, May 9, 1997, Chapter 4 Requirements Chapter 5 Architectural Design and Chapter 6 Detailed Design, pp. 11 to 148; Product Specification DIDS, PGT Software External Interfaces Specification, NASA-DID-010, V1.2, May 23,1997; Product Specification DIDS, PGT Software User's Guide, NASA-DID-P600, V1.2, Dec. 30, 1996; Product Specification DIDS, PGT Intool Software Version Description, NASA-DID-P510, V2.2, Dec. 18, 1996; Product Specification DIDS, PGT Remote Software Version Description, NASA-DID-P520, V2.2, Jan. 6, 1997. The computer code annexed to this application is also incorporated by reference.

GOVERNMENT RIGHTS

The invention described herein was made by employees of the United States Government. It may be manufactured and used by or for the Government for governmental purposes without the payment of any royalty thereon or therefor.

BACKGROUND

The field of invention is computer-implemented control of a hand held tool. In particular, the control of a hand held tool for controlling speed of a shaft and the torque applied to fasteners by the fastener interface mechanism of the hand-held tool and monitoring the operating parameters of the tool.

Hand tools are used in space by astronauts to change instruments on spacecraft such as the Hubble Space Telescope. Computer-implemented control of a hand-held tool in space has particular requirements. The requirements of space flight require that the electronics be radiation tolerant and be spaceflight qualified. To be radiation tolerant, the electronics must be able to withstand being bombarded by particles such as protons and neutrons at much higher rates than on earth where the atmosphere provides protection against such constant bombardment. Being spaceflight qualified also requires that the device be able to operate in the military temperature range of –55 deg Celsius to +125 deg Celsius. Furthermore, the computer-implemented control of the hand-held tool must allow for remote operation of the tool. The ability to control the tool remotely is necessary in a facility which is hazardous or inconvenient for human beings such as a nuclear facility or a thermal vacuum chamber in which a robotic arm may actually hold the hand-held tool while a remote human operator is directing the tool.

SUMMARY

The present invention is directed to a computer-implemented method and apparatus for controlling the torque and speed applied to fasteners by a hand-held tool and for monitoring the operating parameters of the tool. An apparatus having the features of the present invention comprises a housing having a hand-grip portion for an operator to grasp. The housing also comprises a trigger located on its exterior which an operator will press to put the tool in a running state and release to put the tool in an idling state. The trigger switch sends a signal that alerts a program controlled processor contained within the housing as to whether the tool is in a running or idling state. Also located on the exterior of the housing are display indicators for communicating information to the operator in response to messages generated by the processor. In an embodiment of the invention, such display indicators would comprise an alphanumeric display located on the exterior of the housing for displaying various parameter values and messages to the operator and indicator light emitting diodes (LEDs) also located on the exterior of the housing to alert the operator to various conditions of the tool's operation. The present invention further comprises selection controls located on the exterior of the housing for an operator to select torque and speed parameters. These selection controls may further comprise controls for selecting between ratchet and motorized operation of the tool, selecting a speed direction and revolutions per minute value to be applied to a fastener by the tool, and for selecting several combinations of torque and a number of revolutions to be applied or the degree angle not to be exceeded.

The housing contains an electric motor whose shaft applies force to a mechanism that connects with the fastener to apply torque to the fastener at a certain speed and direction. The mechanism is called a fastener interface mechanism. Current through the motor's windings controls this force. Connected to the motor is a circuit breaker for controlling current to the motor. Also contained within the housing is a torque transducer responsive to the force being applied to the fastener interface mechanism. Additionally contained within the housing is a power supply such as a battery or a power transformer circuit capable of being connected by a cord to a power source. Temperature transducers are also located within the housing to monitor among others the motor temperature and the temperature of the power supply which may be a battery. The output of the torque and temperature transducers will be represented as digital values to the processor.

A programmed controlled processor controls an interrupt driven state machine for the purposes of monitoring the operating parameters of the hand-held tool, keeping a performance history of the tool's operation comprising performance records, communicating with a remote computer as well as controlling the torque and speed applied to fasteners. The processor contains a clock which provides timing pulses as the interrupts to which the processor responds on periodic and asynchronous bases. The performance history is stored in a nonvolatile, writable memory connected to said processor. During the tool's operation, at least two random access memory (RAM) locations, contained within the housing and accessible to the processor, store the data points which make up the performance records. A separate nonvolatile memory location within the housing accessible by the processor is used for storing performance records of the data points transferred from the RAM. These performance records will be of two varieties. One will contain torque, angle and time information on fasteners as they were tightened or loosened. Another type of performance record will describe events that occurred to the hand held tool (e.g. Tool powered up, temperature fault occurred). The performance history is comprised of select performance records due to the memory time constraints.

The programmed controlled processor and the remote computer communicate with each other for the purposes of transferring data between the two so that an operator can analyze the data stored in the tool, such as that stored in the performance history, can change data values and download them to the nonvolatile memory of the hand-held tool, and can direct the operation of the hand-held tool portion of the apparatus remotely. The processor comprises a first communications port capable of being accessed from the exterior of the housing by a second communications port of the remote computer.

A computer-implemented method for controlling and diagnosing the torque and speed applied to fasteners by a hand-held tool and for monitoring the operating parameters of the tool comprises the steps of monitoring the operating parameters of the hand-held tool comprising a housing with a hand-grip portion, an electric motor contained within said housing having a shaft, said motor being operable in the current mode to control the force to be applied to a fastener interface mechanism connected to the shaft by varying the current through the windings, a power supply for driving said motor and a circuit breaker for controlling the current to the motor; creating a performance history of the tool's operation comprising performance records to be stored in a nonvolatile, writable memory; controlling the torque and speed applied to fasteners by a programmed controlled processor having a clock for generating timing pulses and a first communications port for linking to a remote computer; analyzing at the remote computer said torque, speed and parameter information; and remotely directing the torque and speed to be applied to each of said fasteners by the hand-held tool under the control of the remote computer. The method further comprises the step of transferring the tool to a power conservation mode.

The operating parameters monitored comprise temperatures, a motor current level, and a power supply voltage level. The monitoring step of the method comprises substeps one of which is that the program controlled processor repeatedly determines whether the digital value of a particular operating parameter is within an accepted tolerance range stored in a nonvolatile memory location. If the digital value is not within the accepted tolerance range, a fault indicator light on the exterior of the housing is illuminated, a message is displayed on an alphanumeric display located on the exterior of the housing for alerting the operator that one of the operating parameters is not within its accepted tolerance range, and putting the tool into an appropriate safe state. If the digital value is within the accepted tolerance range, then the processor puts the tool out of the "safe state."

Repeatedly, the processor obtains an indication of the integrity of the computer code stored in the read only memory of the microcontroller and data stored in the nonvolatile, writable memory by performing a checksum on the memory. If a checksum test fails, the processor puts the tool into a self test fail state, which may only be exited upon cycling power to the tool. Otherwise, the processor returns the tool to an idling state. Unused memory is reset with single-byte opcodes.

Initial data for controlling the torque and speed applied to fasteners by a program controlled processor having a clock for generating timing pulses and a first communications port for linking to a remote computer comes from the remote computer providing torque and speed data. Providing this data comprises the substeps of sending a communication signal from the second communications port of the remote computer to the first communications port of the processor signifying that the remote computer seeks to download data to the nonvolatile, writable memory of the hand-held tool; sending a ready signal from the first communications port of the processor to the second communications port of the remote computer; and upon receipt of the ready signal, transmitting from a permanent memory of the remote computer to the nonvolatile, writable memory of the hand-held tool the programmed torque, the torque threshold, the torque angle, turns count and turns count direction for each fastener.

Controlling the torque and speed applied to fasteners by a program controlled processor further comprises the substeps of the processor receiving a signal that the tool is in a running state from a trigger located on the exterior of the housing for switching the tool between a running state and an idling state; receiving a digital value representing a torque value sensed by a torque transducer, responsive to the force being applied to a fastener interface mechanism by the shaft of the electric motor, having an output capable of being transferred as a digital value to the processor; the processor calculating an actual torque using the digital value; and then calculating the turns count achieved based on a boxcar averaging algorithm of a number of motor shaft turns represented by a finite number of digital electronic pulses generated by electronics connected to the motor's shaft. Next the processor compares the calculated torque to the programmed torque and saves to the next empty performance record in the random access memory the calculated torque, calculated turns count, and time for calculated torques that exceed a torque threshold stored in the nonvolatile, writable memory of the tool for the fastener. The next substep is verifying that the motor current corresponds with the torque being generated. Upon achieving the programmed torque, the motor is stalled until said trigger switches the tool to an idling state. Then on the alphanumeric display, the programmed torque, a programmed speed, a maximum number of turns, and a number of output revolutions during the tool's operation in the running state are displayed. These substeps are repeated on a periodic basis while digital values representing the torque are available to the program controlled processor.

Creating a performance history of the tool's operation comprises the substeps of copying data points stored in one of at least two random access memory locations to a separate nonvolatile memory location as performance records contained within the housing of the tool and connected to the processor while continuing to save data to another random access memory location to prevent the loss of any data; upon the tool entering an idling state, selecting a number of performance records containing torque, turns count and time data for a finite set from all such records stored in the separate memory wherein for the previous running state of the tool, said finite set includes a record with the data for the first time the torque threshold was achieved, a record containing the peak torque achieved, and additional records containing predetermined turns count ratios based on the turns count between the time the torque threshold was achieved and the peak torque achieved; and storing the finite set in the performance history in nonvolatile memory. The first two of these three substeps are performed on a periodic basis and the third substep is performed in part over several periods to prevent loss of data.

In a version of the invention, the finite set contains five performance records having the record containing the data for the first time the torque threshold was achieved, the record containing the peak torque achieved, a record containing the data whose turns count value is one-quarter the turns count difference between the first and fifth data points, a record containing the data whose turns count value is one-half the turns count difference between the first and fifth data points, and a record containing the data whose turns count value is three-quarters the turns count difference between the first and fifth data points. The first of these two substeps are performed on a periodic basis of five milliseconds while the third substep is performed in part over several periods to prevent loss of data.

It is an object of the invention to capture and store over two hundred (200) performance records. These performance records will be of two varieties. One will contain torque, angle and time information on fasteners as they were tightened or loosened. From such information, an analysis of the condition of the fastener, for example whether it is stripped or not can be determined. Another type of performance record will describe events that occurred to the hand held tool such as when the tool powered up, or when a temperature fault occurred. The performance history also provides maintenance information such as total turns counts since the tool was assembled and the total amount of time a non-zero voltage has been applied to the motor. The performance history can be uploaded from the nonvolatile memory of the hand-held tool to a text file that can be imported into any number of spreadsheet programs.

BRIEF DESCRIPTION OF THE DRAWINGS

These and other features, aspects, and advantages of the present invention will become better understood with regard to the following description, appended claims, and accompanying drawings where:

FIG. 18 shows a display of the Torque/Revolutions Settings Table.

FIG. 19 shows a display of the Speed Table.

FIG. 20 shows a Tool Monitor Screen display.

Figure 2:
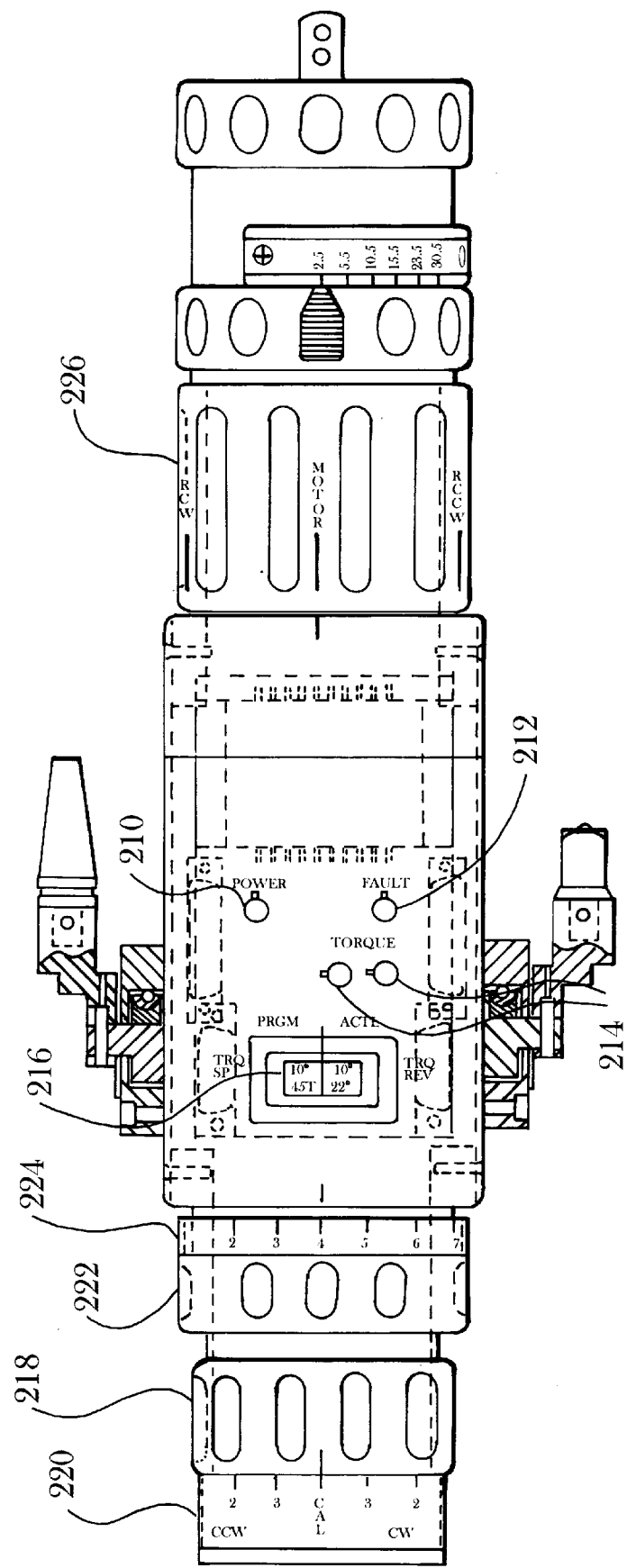
FIG. 2 shows a top view of the embodiment in FIG. 1 featuring an alphanumeric display and light emitting diode indicators.

TABLE 1 shows versions of fault messages which an operator would read on an alphanumeric display such as that in FIG. 2.

DETAILED DESCRIPTION

Figure 1:
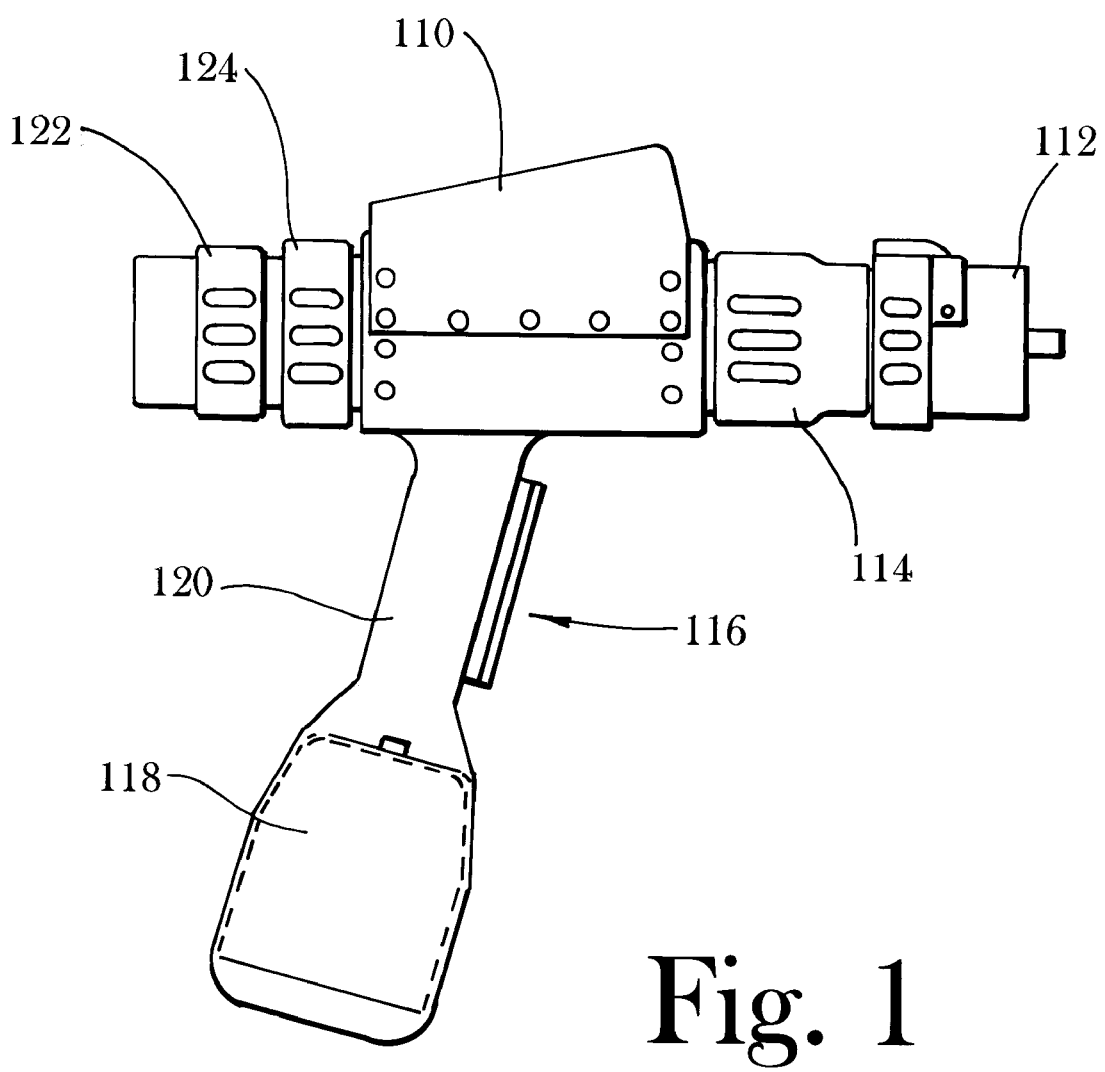
FIG. 1 shows an embodiment of a hand-held tool that the method and apparatus would control in applying torque and speed to fasteners.

FIG. 1 shows an embodiment of a hand-held tool that the method and apparatus would control in applying torque and speed to fasteners. 110 is a compartment of the housing which would contain the intool electronics which comprise the computer-implemented apparatus. 112 is a fastener interface mechanism. 114 is a collar which puts the tool in a manual ratchet mode of operation or motorized mode of operation. 116 is a trigger. 118 is a part of the housing suitable for a power supply such as a battery. 120 is the hand grip portion of the housing for an operator to grasp. 122 is a collar for setting the speed to one of three values in either the clockwise or counterclockwise direction (See FIG. 2). 124 is a torque collar (See also FIG. 2).

FIG. 2 shows a top view of the embodiment in FIG. 1 featuring an alphanumeric display 216 and a power on/off light emitting diode (LED) indicator 210, a fault LED 212, two LEDs which separately and together indicate to the operator torque information 214.

Figure 3:
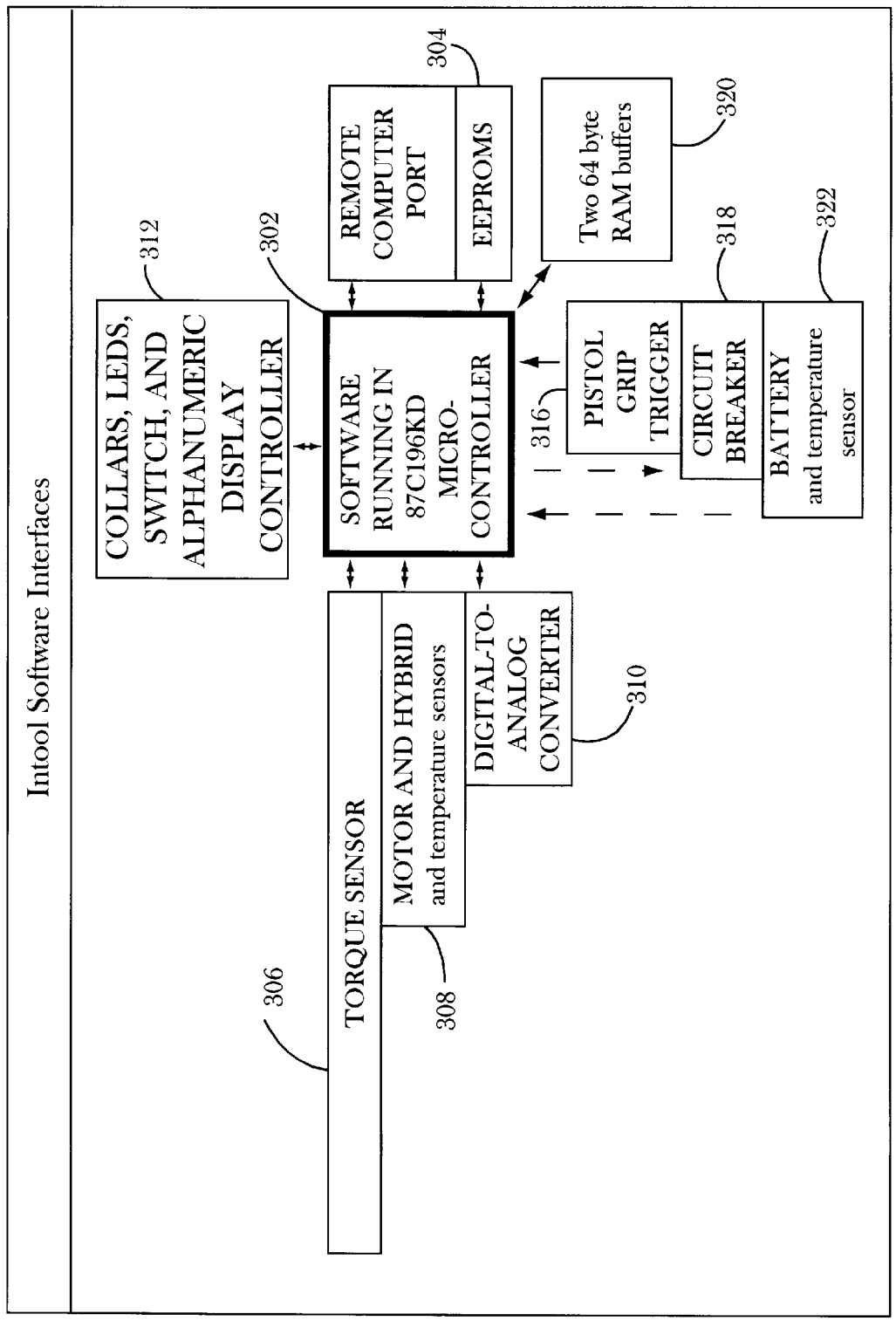
FIG. 3 shows a diagram of the interfaces of the software located within the housing of the tool.

In one embodiment of the computer-implemented method for controlling and diagnosing the torque and speed applied to fasteners by a hand-held tool and for monitoring the operating parameters of the tool, the method is directed by two computer programs, one of which will be referred to as the intool software embedded on a processor within the housing of the hand-held tool and the other, the remote software which is executed on a separate computer with a graphical user interface. FIG. 3 shows the interfaces of the intool software in an embodiment of the invention.

FIG. 3 shows the processor on which the intool software is run as a microcontroller 302. In this embodiment, the microcontroller has a hardware structure known as a peripheral transaction server (PTS) (not shown) which performs write blocks of data to one of the EEPROMS 304 and performs successive analog-to-digital conversions while the intool software is executing other code. The microcontroller also comprises an interrupt controller and a communications port.

The digital values are received by the processor for the software to evaluate from the torque sensor 306 and temperature sensors of the Motor and Hybrid 308. This particular embodiment has a Hyrbrid circuit which relates the current of the motor to the microcontroller 302 and which also contains a comparator circuit which compares an analog value of the current to an analog version of a programmed torque value stored in nonvolatile memory and converted by the digital to analog converter 310. The software running in the microcontroller 302 in this embodiment of the invention interfaces with a hardware alphanumeric display controller 312, light emitting diodes 312 such as those shown in FIG. 2 which relate fault and torque conditions to the operator, three collar switches 312 and a mode switch 312. The software is responsive to the position of a trigger 316. It also can activate a circuit breaker to stop current to the motor 318. The software acknowledges a serial receive interrupt and serial transmit interrupt when a hardware communications port of the microcontroller receives and transmits data respectively. The software prevents access to the nonvolatile EEPROM during uploading and downloading. The actual transfer of data between the intool microcontroller and the remote computer is controlled by the hardware communications ports of both. In one embodiment, the communications ports may be an RS-232 port. In an alternate embodiment, it may be an RS-422 port.

The microcontroller in the embodiment of FIG. 3 contains two EEPROMS as nonvolatile memories. One is used as a scratchpad memory, in which it is a separate memory location for storing performance records as they are created by the software. The other EEPROM is a nonvolatile, writable memory which will contain over 200 performance records which have been selected from those stored in the scratchpad EEPROM to represent up to 10.24 seconds worth of data which will be the performance history. The microcontoller is also connected to two random access memory buffers (320) of 64 bytes each. Data points which will make up performance records will be first stored in one of the two RAM buffers. While one buffer transfers its data to the scratchpad EEPROM, the other continues to receive data which it will next write to the scratchpad EEPROM when full. In this way data is not lost. These RAM buffers are required for the particular embodiment due to spaceflight requirements on the electronics. The embodiment depicted in FIG. 3 is usable in outer space because it uses software to overcome deficiencies in available electronics to meet spaceflight requirements such as radiation tolerance. The particular EEPROMS that work in connection with the 87C196KD microcontroller or similar processor require that all writes to them be to a single page. The PTS of the microcontroller performs the block write, but the program in the processor prevents data from being lost during the write.

Figure 4:
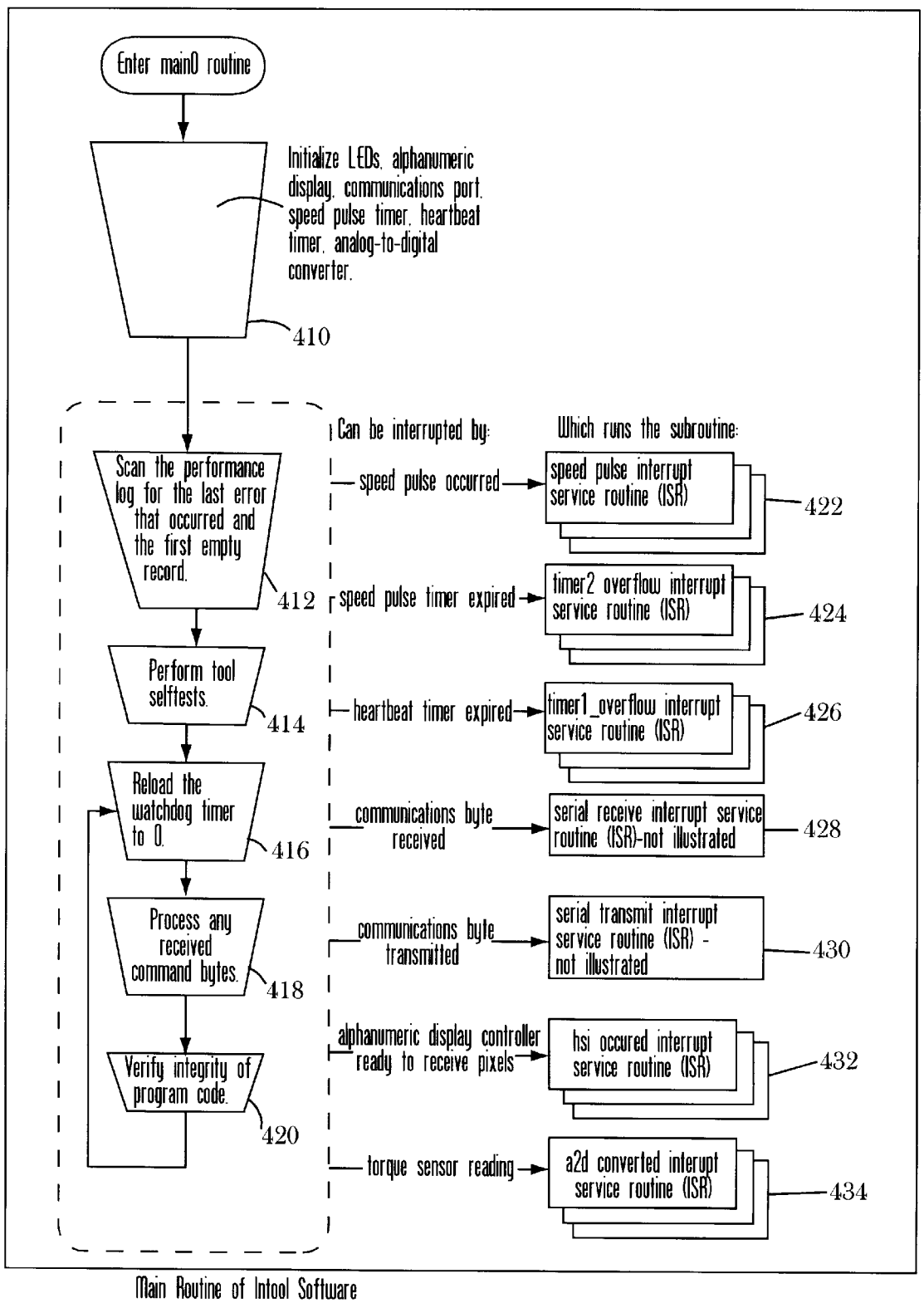
FIG. 4 shows a flowchart of the Main Routine of the Intool Software.

The intool software is written as an interrupt-driven state machine. The main functions of the intool software are performed by the main program and several interrupt service routines, subroutines and functions. FIG. 4 shows a flowchart of the Main Routine of the Intool Software. After the initialization steps illustrated in 410, the main routine runs as an infinite loop which can be exited to process interrupts or peripheral transactions but is always returned to when this processing is done.

The main loop consists of three steps. In the particular embodiment shown, a watchdog timer is enabled the first time it is written to and subsequent writes clear its counter 416. The watchdog's counter must be cleared within a particular period of time, 8.192 milliseconds in this embodiment, of its last clearing or the microcontroller will reset. The next step is to process any received command bytes 418. After the processing, a checksum is performed on the microcontroller's ROM and the EEPROMs to verify the integrity of the program code 420. If the checksum passes, its counters are reset. Otherwise, the tool enters a self test fail state.

Figure 5:
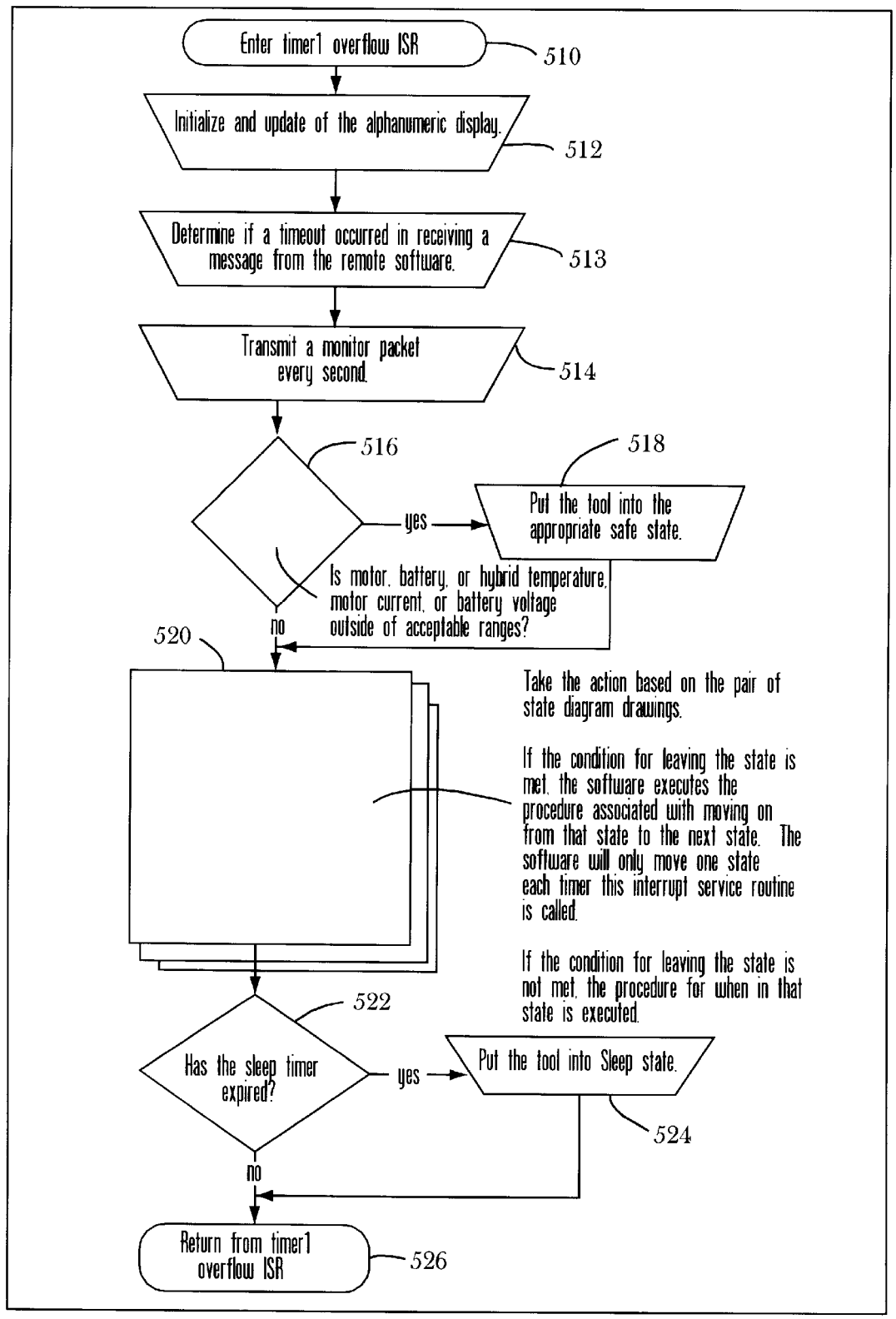
FIG. 5 shows a flowchart of the Routine called when the heartbeat timer expires in the Intool Software. The heartbeat timer is a scheduled periodic interrupt.
Figure 6:
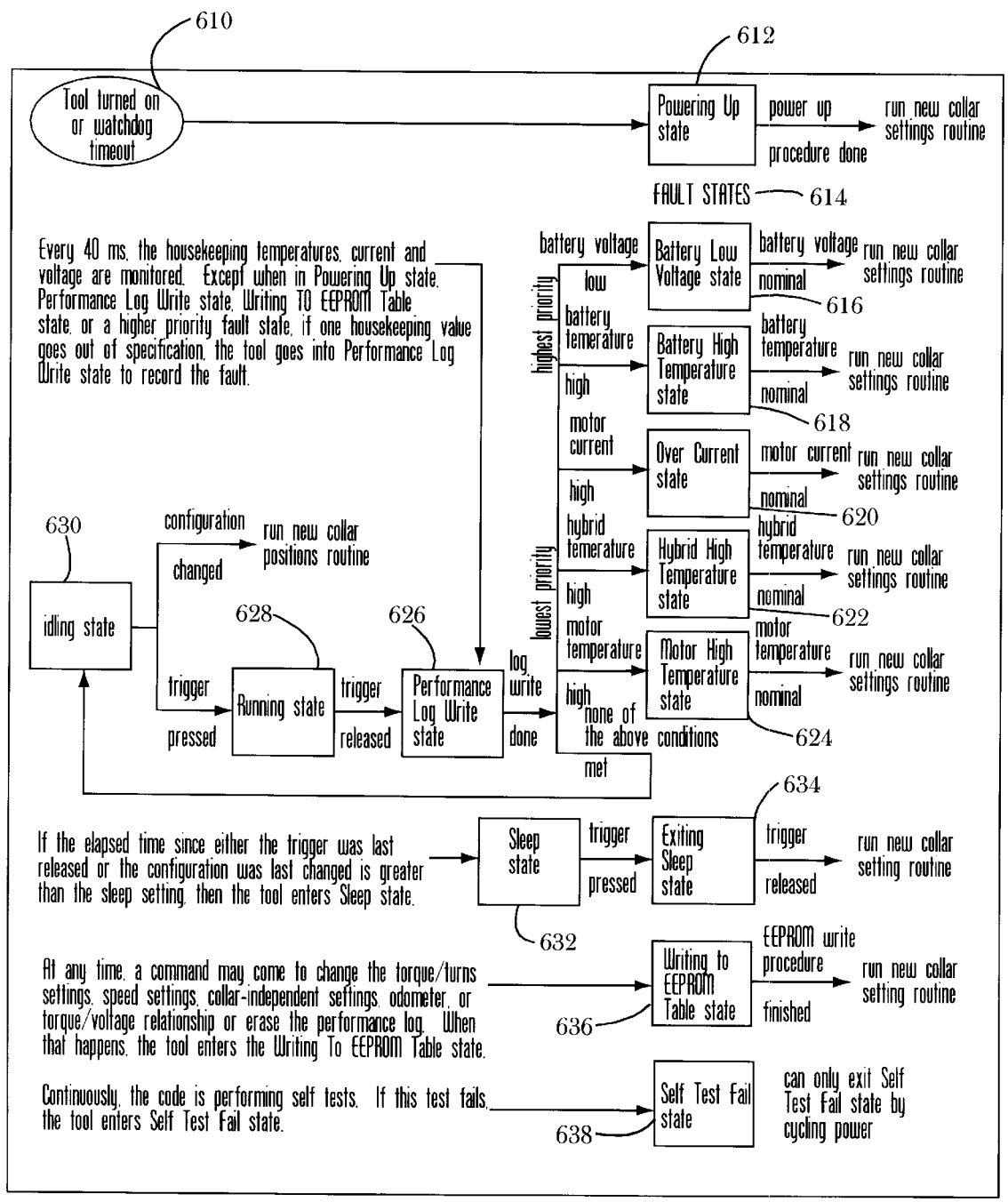
FIG. 6 shows the First of 2 State diagrams showing the action taken when the heartbeat timer expired in the Intool Software.

As shown in FIG. 4, there are various interrupts which the intool software processes through interrupt service routines in order to monitor operating parameters of the hand-held tool, create the performance history, communicate with the remote computer and control the torque and speed applied to fasteners. The timer1_overflow interrupt service routine services the heartbeat timer expired interrupt. The heartbeat timer serves as a period, the heartbeat of the software, upon which all scheduled events are timed. In this particular embodiment, the period is 5 milliseconds. The heartbeat timer is loaded to overflow again in 5 milliseconds by the Timer1_Overflow Service Routine, whose flow chart is shown is FIG. 5. Box 520 on the flowchart references the state diagram drawings of FIGS. 6 and 7. The operating parameter comprising the housekeeping temperatures of the power supply, a battery in this embodiment, the hybrid circuit and the motor, the motor current and the battery voltage are monitored. If one of the values is not within an accepted tolerance range, FIG. 6 shows that the software put the tool in a fault state 614. Data recording the fault is written to a random access memory buffer from where it will be eventually transferred to the scratchpad EEPROM and then to the nonvolatile EEPROM containing the performance history 626. Upon a fault, the software puts the tool in a safe state in which the tool is in the idling state 630 and FIG. 5 518 until the particular parameter comes within the accepted range. A fault light emitting diode shown in FIG. 2 is illuminated and an appropriate fault message such as those shown in TABLE 1 will be displayed on the alphanumeric display.

The Timer1 service routine also transfers the tool to a sleep state 632 and 524 or power conservation mode if the elapsed time since either the trigger was last released or the configuration was last changed is greater than a stored sleep setting 522.

This service routine is also responsive to commands from the remote computer to download data. This routine will put the tool in a Writing to EEPROM Table state 636 when a command comes in to change the torque/turns settings, speed settings, collar-independent settings, odometer, torque/voltage relationship or to erase the performance log. The PTS of the microcontroller of FIG. 3 controls the actual sending and receiving of commmunications signals between the ports of the microcontroller and the remote computer in this embodiment.

If a checksum test has failed, this routine puts the tool in a Self Test Fail state 638 which can only be exited by cycling power.

Figure 7:
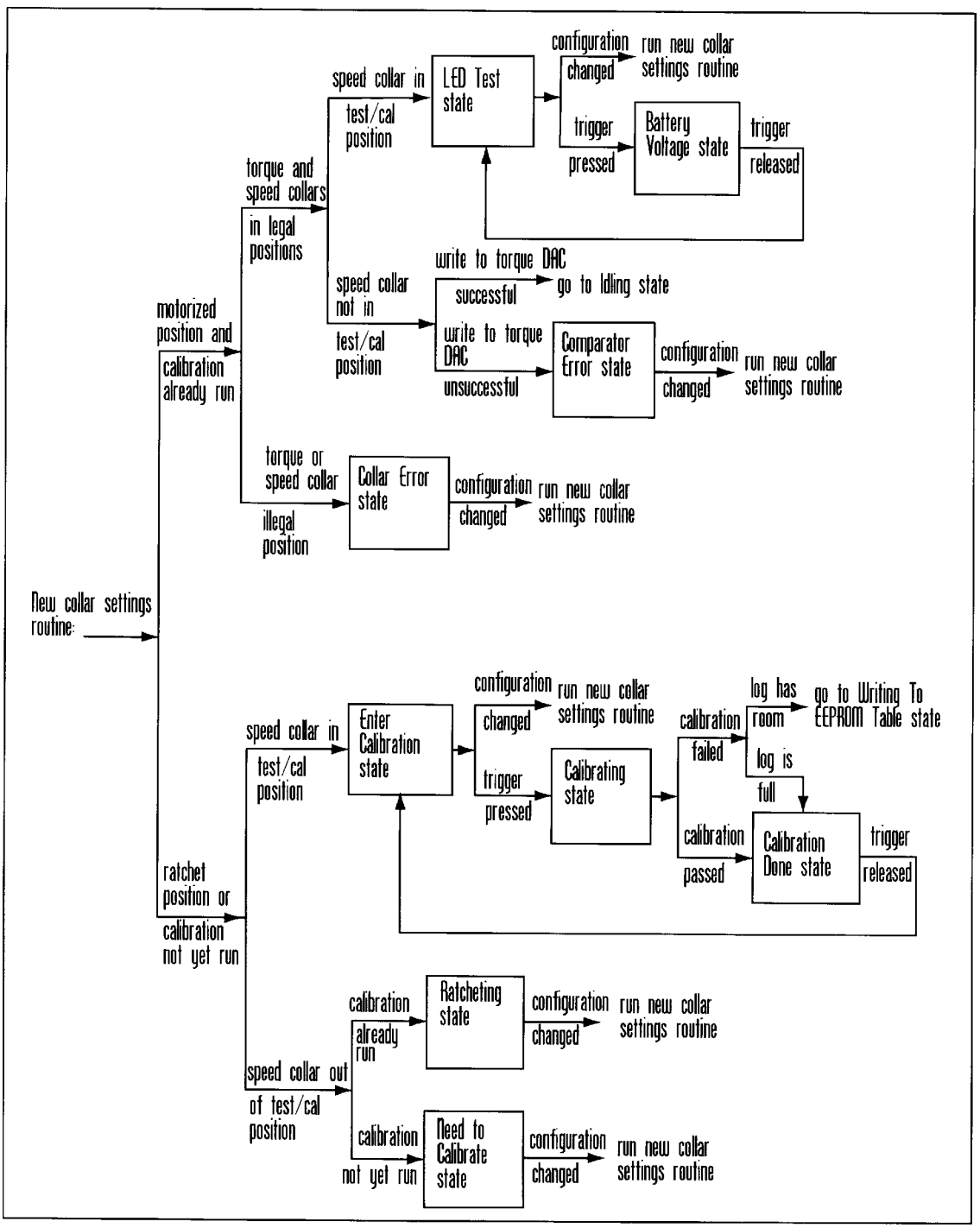
FIG. 7 shows the Second of 2 State diagrams showing the action taken when the heartbeat timer expired in the Intool Software.

FIG. 7 shows that during the interrupt service routine of the heartbeat timer, when a ratchet collar such as 114 is in the motorized position, the torque 124 and the speed 122 collars are not in illegal, or the speed collar is not in the calibration position, that the programmed torque is written to the digital to analog converter for comparision in the Hybrid comparator circuit.

FIG. 7 also shows that upon a failure of calibration, a performance record is made to record the event.

Figure 8:
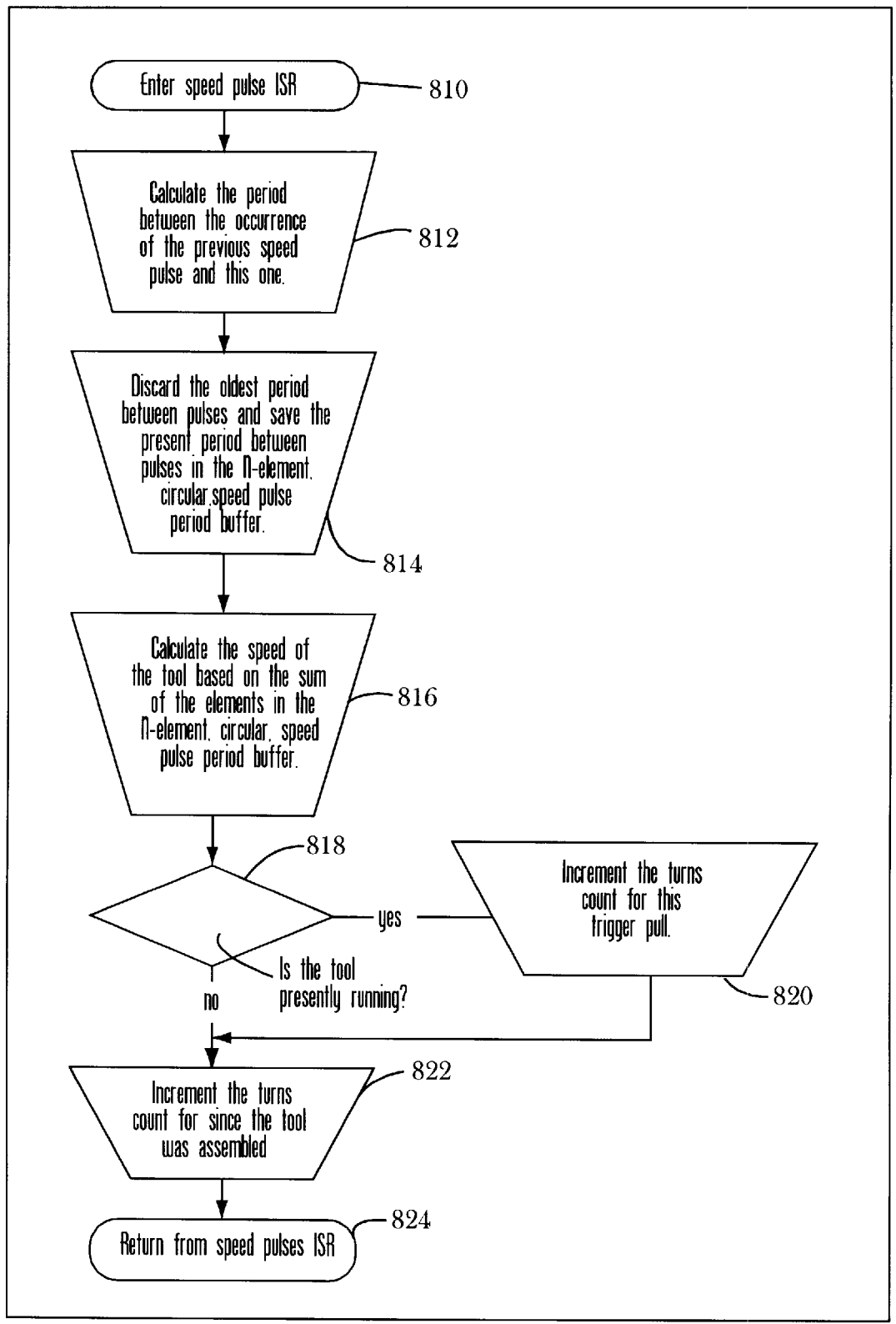
FIG. 8 shows the Routine called when a speed pulse occurs in the Intool Software.
Figure 9:
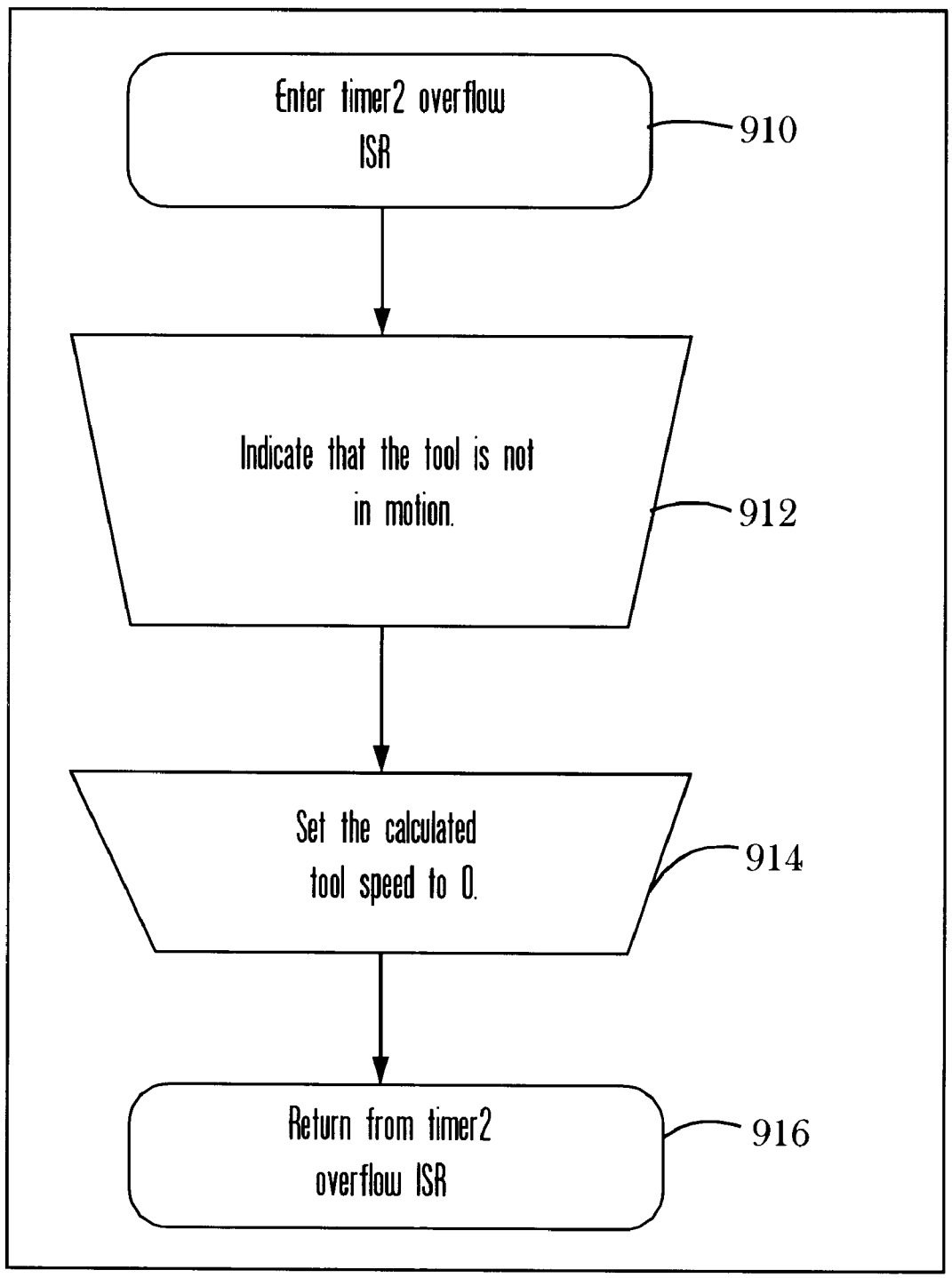
FIG. 9 shows a flowchart of the Routine called when a speed pulse timer expires in the Intool Software.

FIG. 8 shows the interrupt service routine in which the turns count is calculated. The processor calculates the turns count achieved based on a boxcar averaging algorithm of a number of motor shaft turns represented by a finite number of digital electronic pulses generated by electronics connected to the motor's shaft. An embodiment of this step is shown in the speed pulse interrupt service routine of FIG. 8. Each time the fastener interface mechanism rotates once, the motor shaft in this particular embodiment rotates 111.2727 . . . times. Each time the motor shaft rotates one-twelfth of a turn, the motor electronics generates a short duration digital speed pulse. The microcontroller in this embodiment has another timer, called Timer2 which is used to time the period between speed pulses. As may be seen from the flow chart of the main intool software routine FIG. 4, there are two interrupts dealing with the speed pulses. When one, denoted as the speed pulse timer expired in FIG. 4 occurs, the timer2 overflow interrupt service routine of FIG. 9 is called which indicates that the tool is not in motion 912 and sets the calculated speed to zero 914.

The second interrupt that the speed pulse occurred causes the speed pulse interrupt service routine to be called which is shown in FIG. 8. In order to calculate the period between the occurrence of the previous speed pulse and this one 812, the value in timer2 is fetched which is the amount of time elapsed, in microseconds, since the last speed pulse was responded to. This interrupt should be unmasked whenever possible in the software so that timer2 has in it the closest to possible time between pulses. Timer2 is then reset to overflow in a certain amount of time, for instance 15 milliseconds in one embodiment. If the tool was already in motion, then it is possible to calculate the speed of the tool based on the time since the last speed pulse occurred.

In the embodiment shown in FIG. 8, a circular buffer is being used to calculate the speed of the tool because magnets on the motor that generate the speed pulses to the microcontroller are not evenly placed to create twelve evenly spaced sectors around the motor shaft. To compensate for this unevenness, a boxcar algorithm based upon the amount of time for the most recent N pulses is used to produce a better calculation of speed 816. The formula used in this embodiment is as follows:

$$\sum_{n=1}^{N} periods_n = \frac{timer2ticks}{N \text{ pulses}} \times \frac{12 \text{ pulses}}{1 \text{ motor revolution}} \times$$

$$\frac{111.2727... \text{ motor revolutions}}{1 \text{ tool output revolution}} \times \frac{1 \times 10^{-6} \text{ seconds}}{1 \text{ timer2tick}} \times \frac{1 \text{ minute}}{60 \text{ seconds}}$$

$$\sum_{n=1}^{N} periods_n = \frac{1}{N \times 44,934.64052} \times \frac{\text{minute}}{\text{tool output revolution}}$$

$$\frac{\text{tool output revolutions}}{\text{minute}} (rpm) = N \times 44,934.64052 \div \sum_{n=1}^{N} periods_n$$

When a speed pulse occurs, the oldest period between speed pulses is removed from the circular buffer and the most recent period between speed pulses is put into the circular buffer 814. The sum of the periods contained in the circular buffer is updated. If less than N pulses have occurred, the speed is based on the number of speed pulses that have actually arrived. After the speed has been calculated, the arrival of a speed pulse also indicates that the motor has turned. If the turns setting is not an angle, or if the setting is an angle and the torque has gone above the threshold setting, the turns count must be updated. As shown in FIG. 8, the turns count since the tool was assembled is updated as well as the turns count for this running state.

Figure 10:
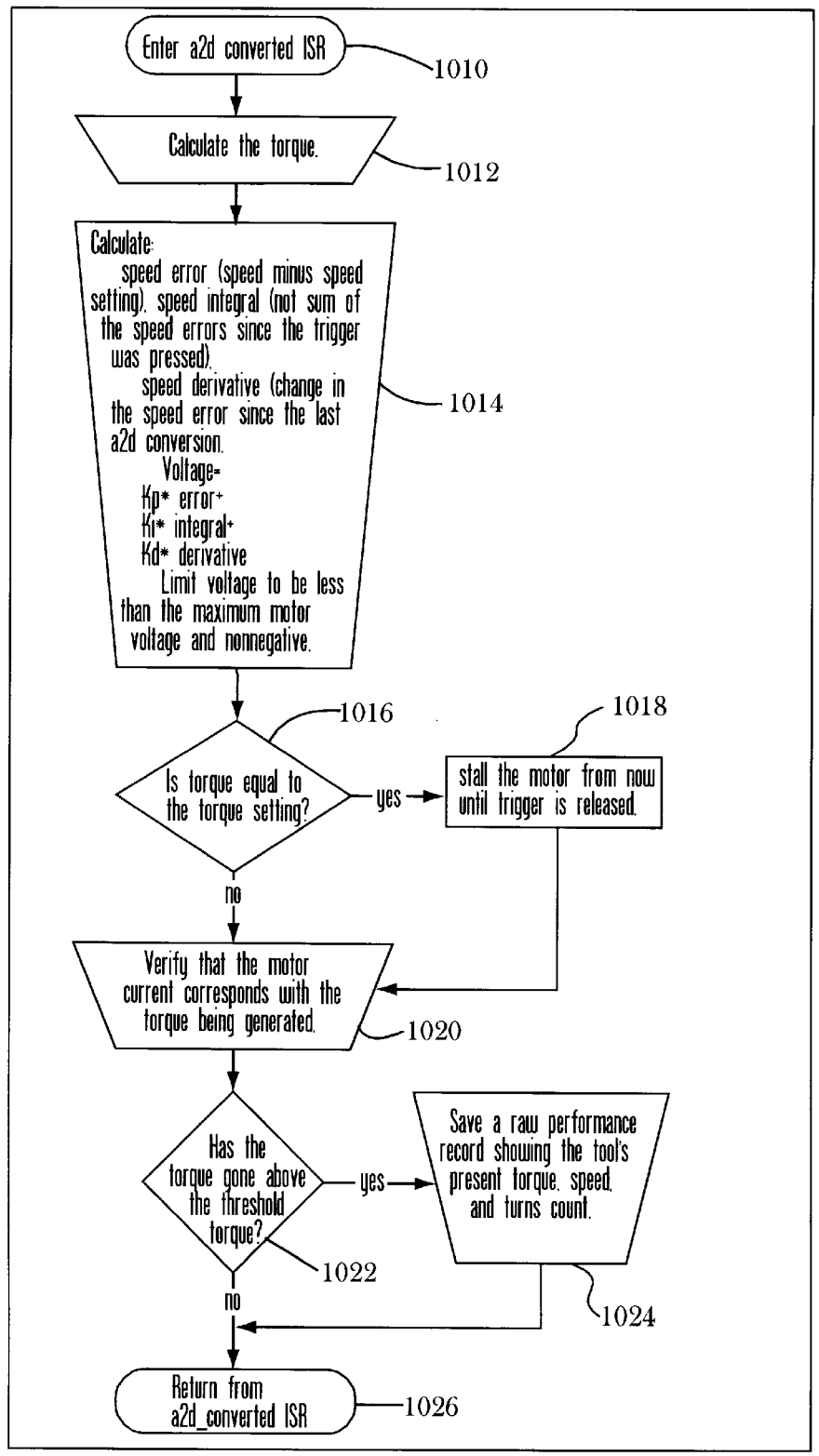
FIG. 10 shows a flowchart of the Routine called when the torque sensor has finished converting in the Intool Software.

FIG. 10 shows the flowchart of the interrupt service routine called when an analog to digital conversion of the torque sensor has completed. This interrupt service routine is called only when the software is in the running or calibrating state and has just converted the torque before exiting the timer1_overflow interrupt service routine. If the tool is in the running state, the torque is calculated 1012 as well as the speed error, speed error integral and speed error derivative from which a voltage will be calculated 1014. The torque is then compared to the torque setting 1016. If it has reached the torque setting, then the motor is stalled until the trigger is released 1018. If not equal or after stalling the motor, it is verified that the motor current corresponds with the torque being generated 1020. If the torque has gone above the threshold torque, a raw performance record is saved showing the tool's present torque, speed, and turns count 1024 before returning to the main routine 1026. Otherwise, the interrupt routine is exited and control transfers back to the main routine 1026. The alphanumeric display will show the programmed torque, a programmed speed, a maximum number of turns, and a number of output revolutions during the tool's operation in the running state.

Figure 11:
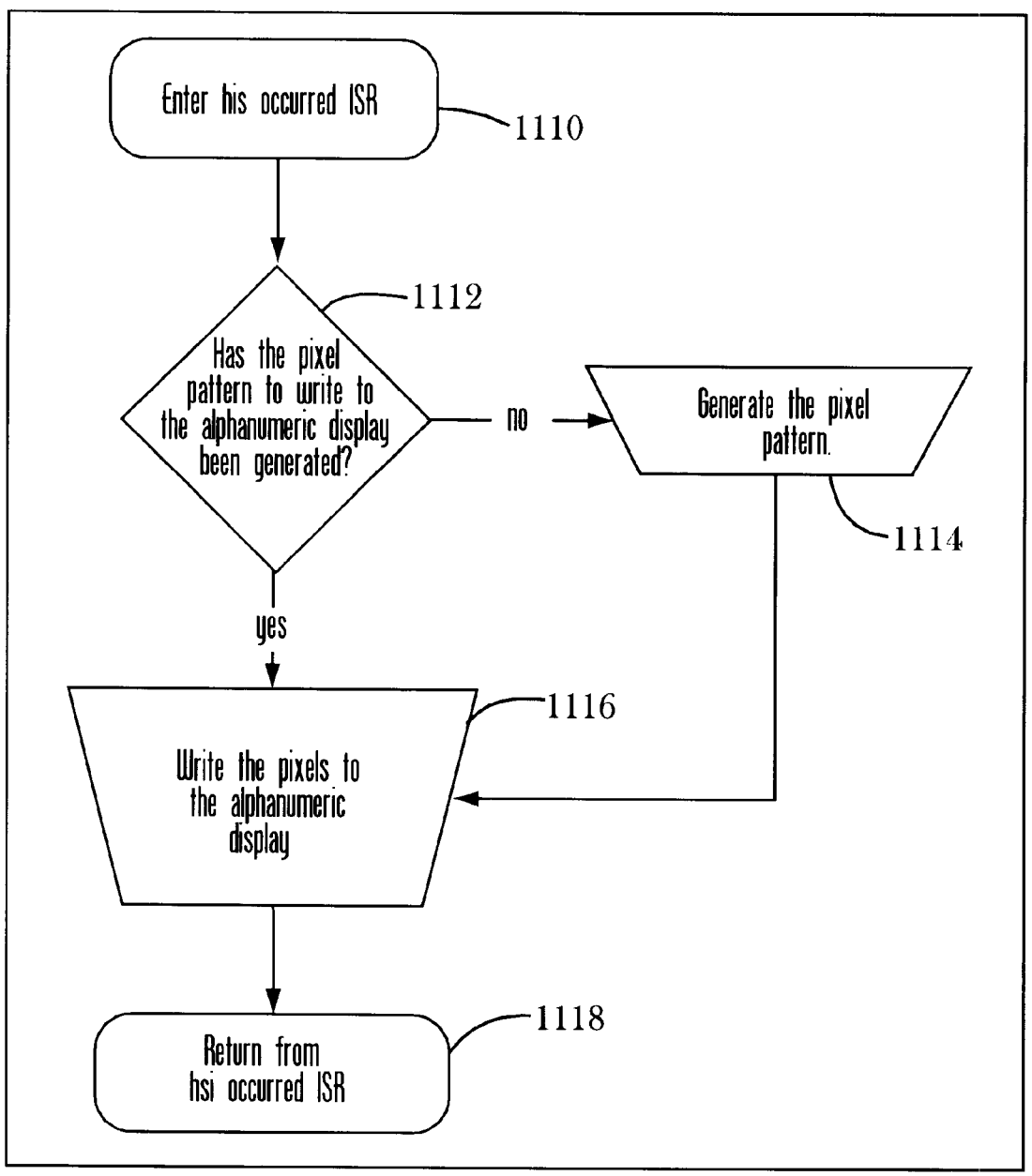
FIG. 11 shows a flowchart of the Routine called when an alphanumeric display controller indicates its ready to receive pixels in the Intool Software.

FIG. 11 is the interrupt service routine called when the alphanumeric display controller indicates it is ready to receive pixels in the intool software denoted as the hsi occurred interrupt service routine in FIG. 4

The remote software runs on a remote computer with a graphical user interface which provides user-friendly operation for analyzing the torque, speed and parameter information about the hand-held tool, as well as providing the ability to remotely control the hand held tool. The remote software allows the user to enter torque and speed values to be used by the tool as the programmed torque and speed values. FIGS. 18 through 21 show an embodiment of the graphical user interfaces through which a user runs the remote software. FIG. 18 shows a display of the current tool settings for fourteen fasteners. The revolutions for each fastener is set in turns, angle or infinite. If the value was not specified in turns or angle, it is infinite. For those with specified angles, the range of degrees is shown in the Angle Window column. The menu shown in FIG. 20 shows that by using a keyboard or by highlighting with a mouse, an operator can select between receiving the current settings from the tool or sending the displayed setting to the tool. FIG. 19 shows the speed settings that a user may select for a fastener. FIG. 20 is a tool monitor screen, illustrative of a display providing operating parameters of the hand-held tool derived from the performance history uploaded to the tool.

Figure 12:
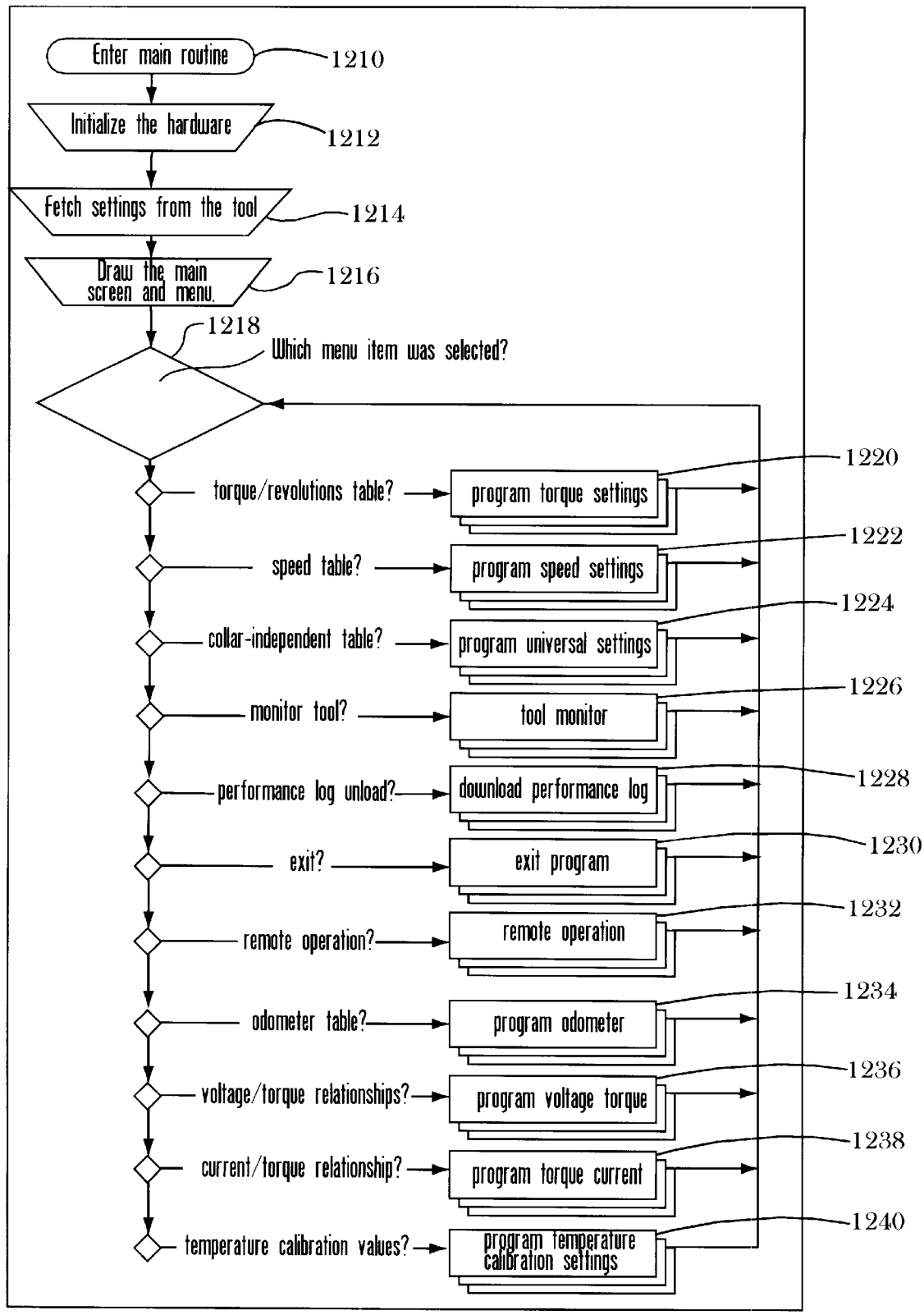
FIG. 12 shows a flowchart of the Main Routine of the Remote Software.
Figure 13:
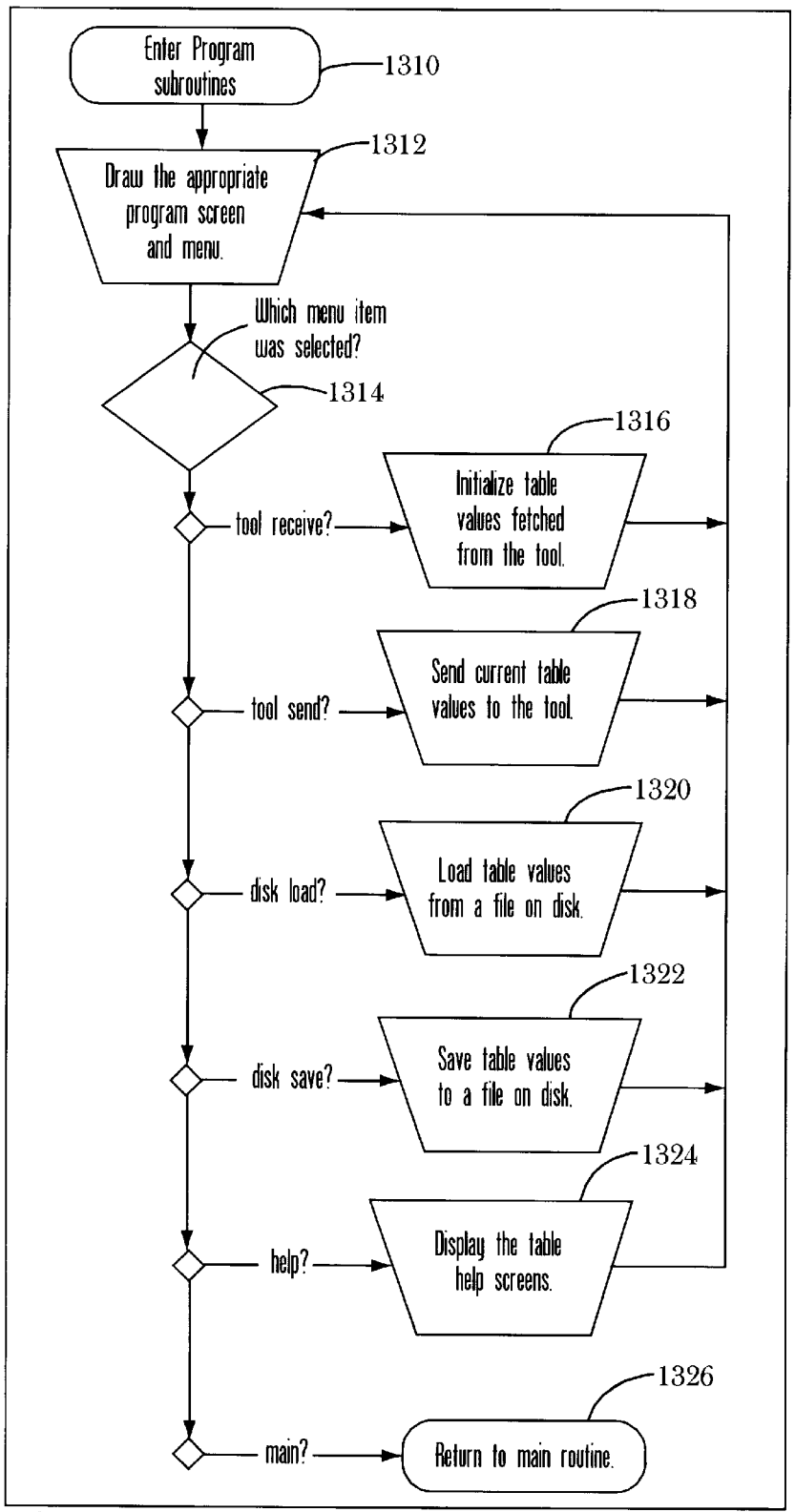
FIG. 13 shows a flowchart of the template of subroutines in the Remote Software which program the torque settings, the speed settings, universal settings, the odometer, the voltage/torque relationship, the torque/ current relationship and the temperature calibration settings.
Figure 14:
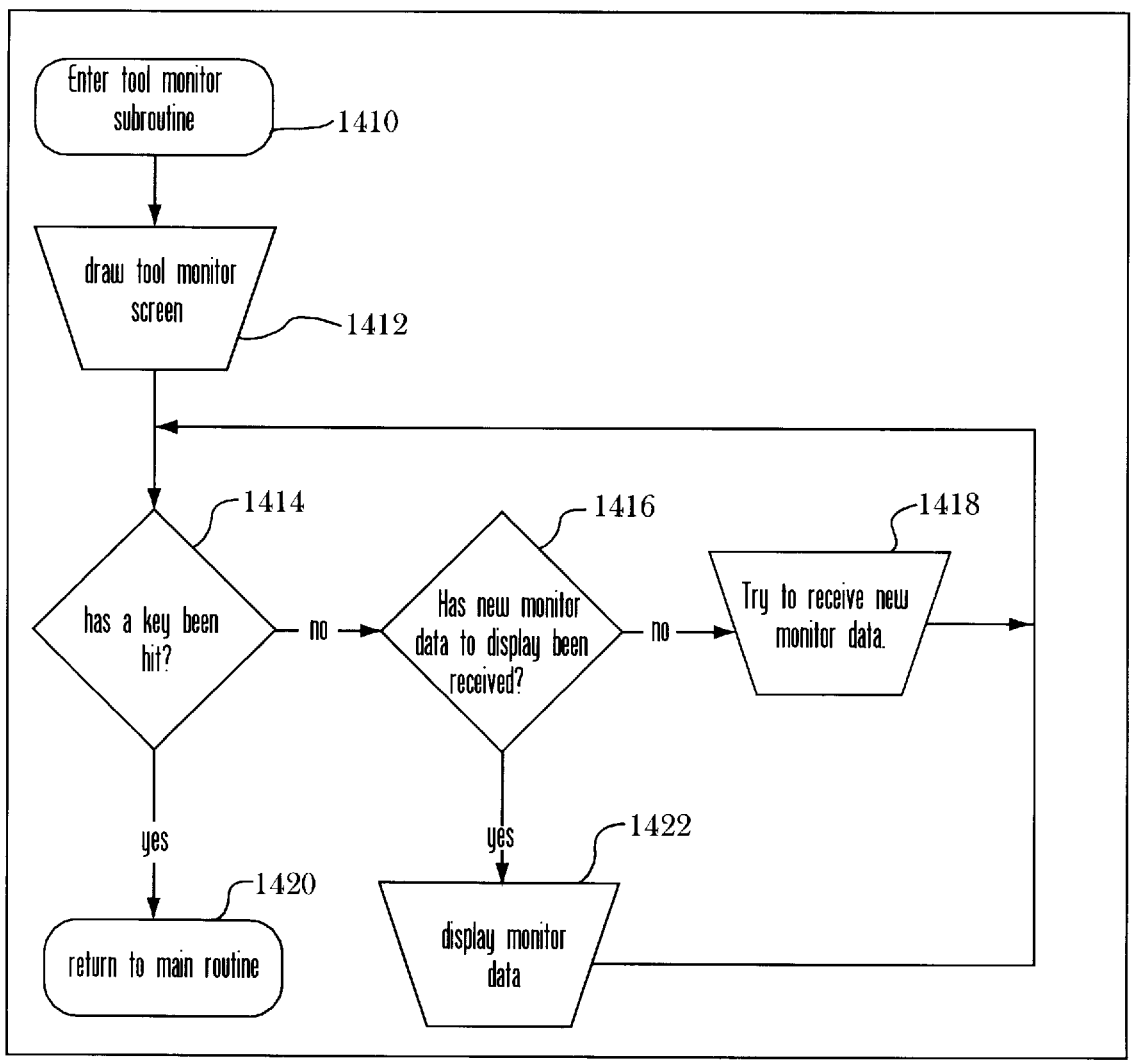
FIG. 14 shows a flowchart of the Monitor subroutine of the Remote Software.
Figure 15:
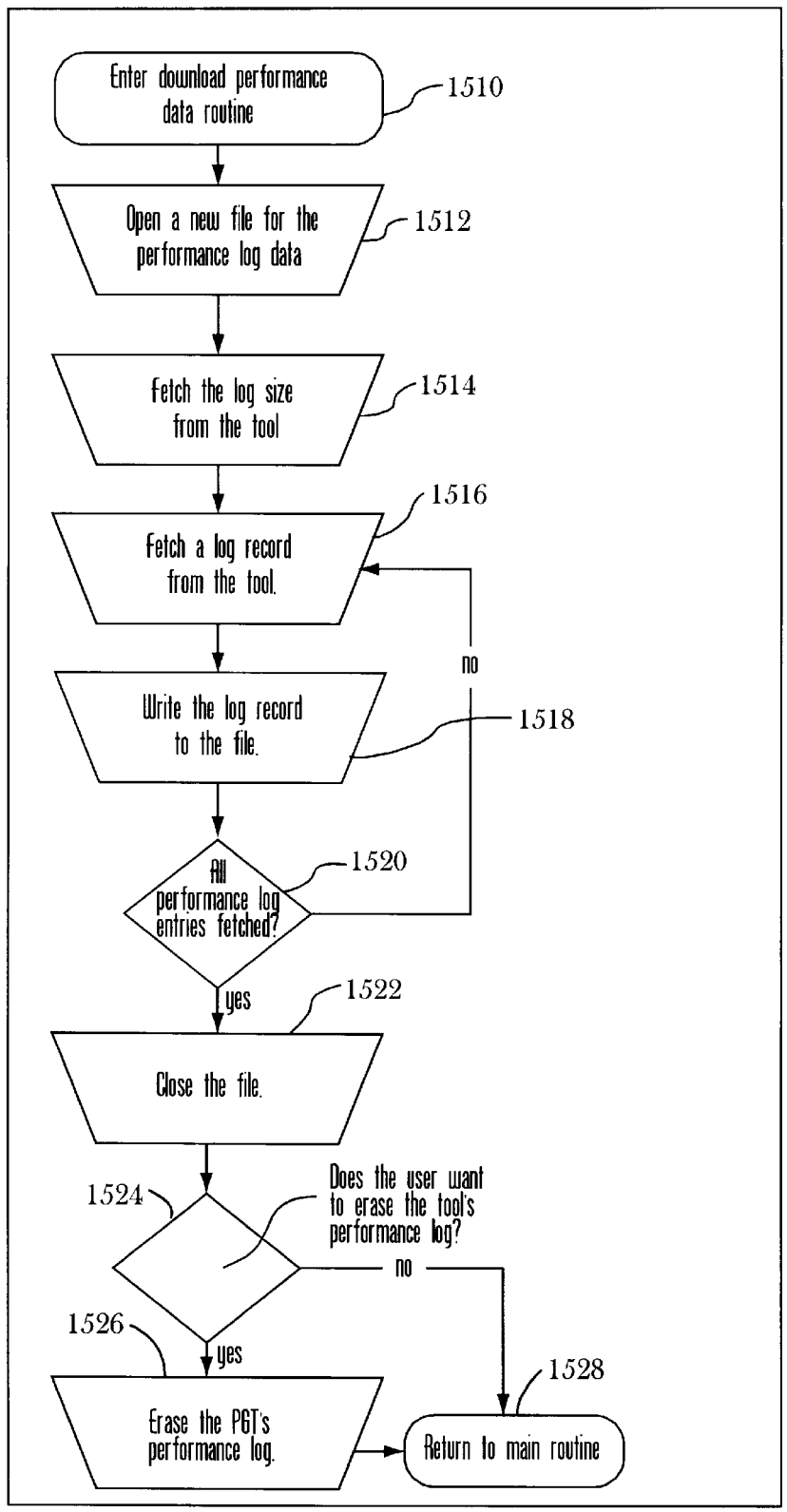
FIG. 15 shows a flowchart of the Upload Performance Log Subroutine in the Remote Software.
Figure 16:
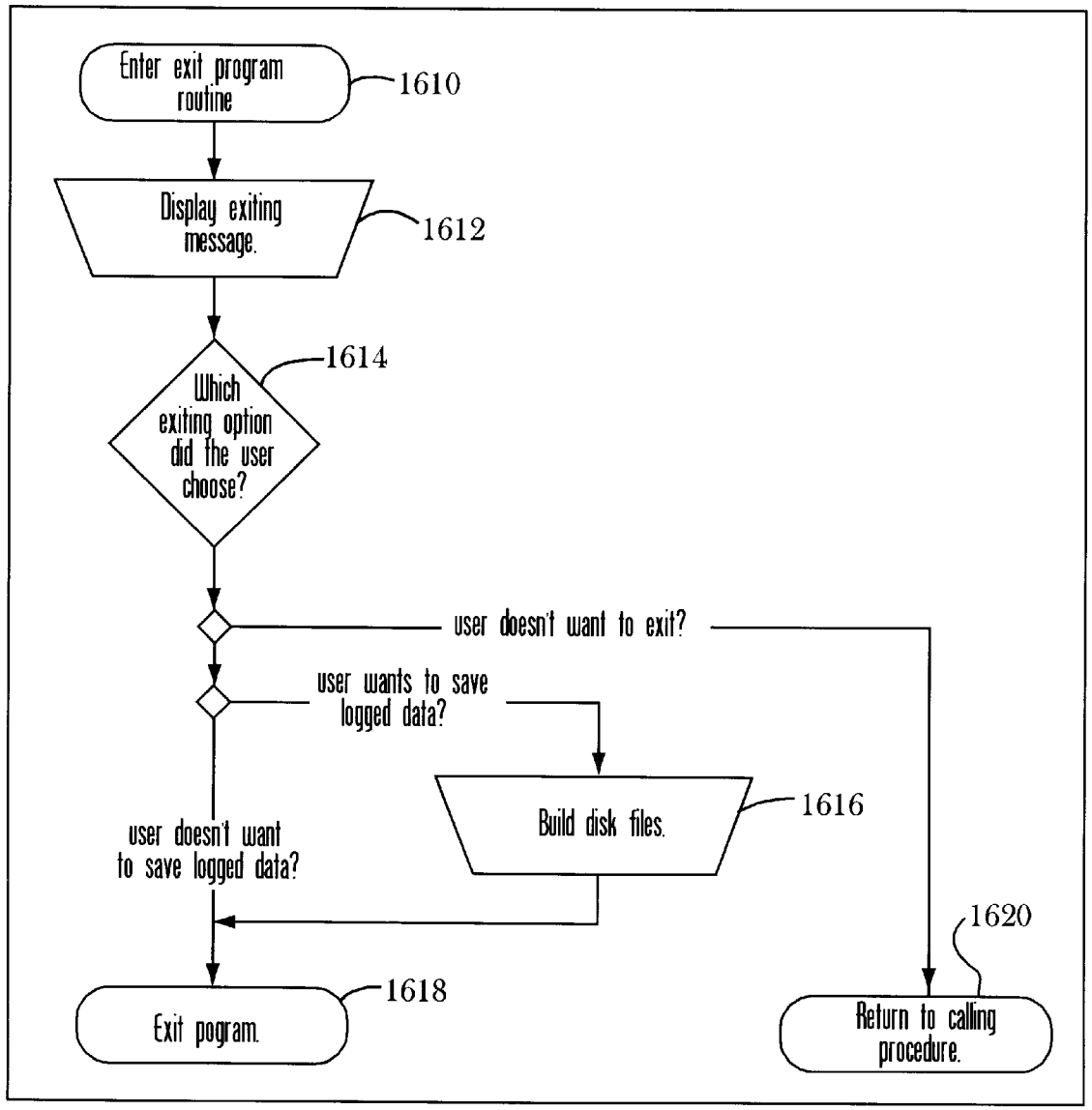
FIG. 16 shows a flowchart of the Exit Subroutine of the Remote Software.
Figure 21:
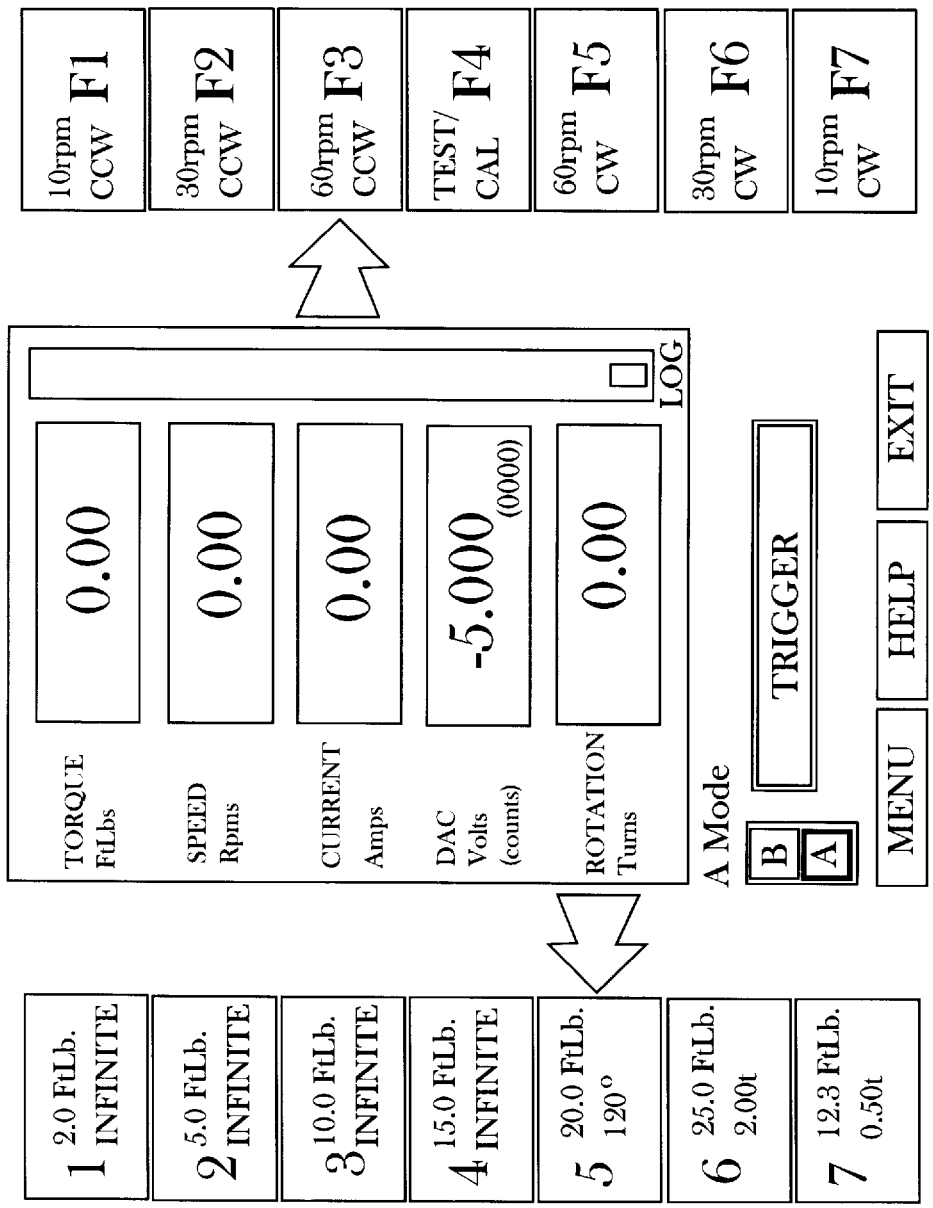
FIG. 21 shows a Remote operation screen.

FIG. 21 is the Remote Operation Screen wherein a user can run the tool from a remote location. The remote software in this embodiment is menu-driven. Such a menu-driven main routine of the remote software is illustrated in FIG. 12. The routine intializes the hardware 1212, fetches settings from the tool 1214 and draws the main screen and menu 1216. Based on the menu selection, a subroutine is called to comply with the menu selection.

Figure 17:
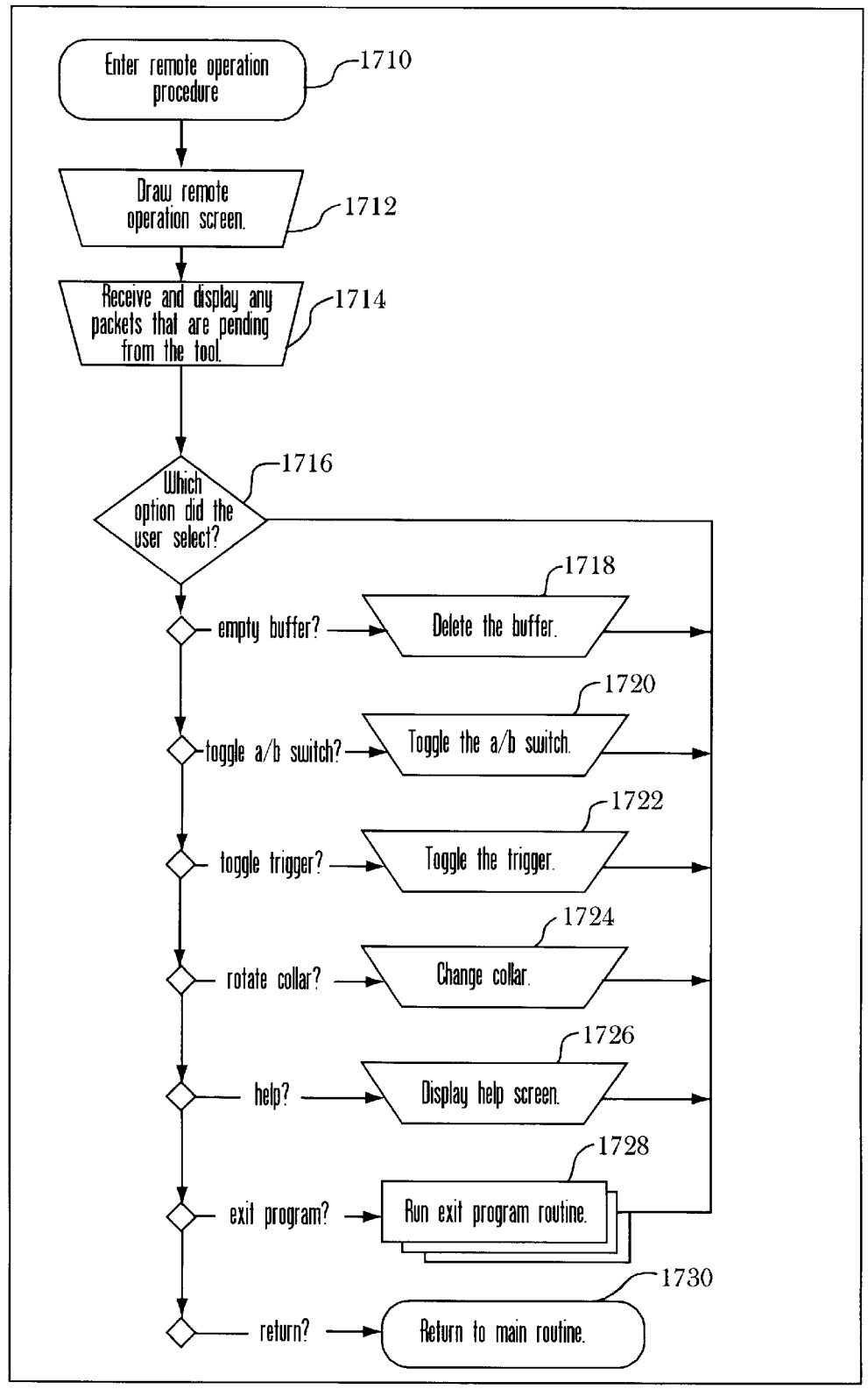
FIG. 17 shows a flowchart of the Remote Operation Subroutine of the Remote Software.

FIG. 17 is the Remote Operation Subroutine of the Remote Software. This routine allows the remote user is able to toggle the trigger 1722, an a/b mode switch 1720, and change collar postions on the tool 1724. The a/b mode switch is not shown in FIG. 2, but it allows the torque collar to have two sets of torque settings so that in the embodiment shown, settings for fourteen fasteners as opposed to seven can be selected. Remote operation is useful in a facility which is hazardous or inconvenient for human beings such as a nuclear facility or a thermal vacuum chamber in which a robotic arm may actually hold the hand-held tool while a remote human operator is directing the tool.

Obviously, many modifications and variations of the present invention are possible in light of the above teachings. It is therefore to be understood that within the scope of the appended claims the invention may be practiced otherwise than as specifically described.

What is claimed is:

1. An apparatus for controlling and diagnosing torque and speed applied to fasteners by a hand-held tool comprising:
   a housing having a hand-grip portion;
   contained within said housing, an electric motor having a shaft, said motor being operable in current mode to control a force to be applied to a fastener interface mechanism connected to the shaft by varying current through the windings;

a processor contained within said housing having a clock for providing timing pulses, wherein said processor controls an interrupt driven state machine for monitoring operating parameters of the hand-held tool, keeping a performance history of the tool's operation comprising performance records, communicating with a remote computer and controlling the torque and speed applied to fasteners;

a nonvolatile, writable memory for storing performance history;

two random access memory locations for storing data points;

a separate memory location for storing said data points into performance records from which the performance history will be selected;

a first communications port located the housing capable of being accessed from exterior portion of the housing by the remote computer for linking said processor with the remote computer;

a torque transducer responsive to the force being applied to the fastener interface mechanism by the shaft of the electric motor having an output capable of being transferred as a digital value to the processor;

temperature transducers located within said housing having outputs capable of being transferred as digital values to the processor;

said remote computer comprising a second communications port for uploading and downloading data to the hand-held tool and a graphical user interface for allowing an operator to manipulate the data and remotely control the tool;

a circuit breaker connected to said motor for controlling current to the motor;

display indicators located on the exterior of the housing for communicating information to the operator in response to messages generated by the processor;

a trigger located on the exterior of the housing for switching the tool between a running state and an idling state and for sending a signal to the processor for the purpose of alerting the processor as to whether the tool is in a running or idling state; and selection controls located on the exterior of the housing for an operator to select torque and speed parameters.

2. The apparatus of claim 1 wherein each of said performance records contains calculated torque, calculated turns count, and time for calculated torques that exceed the torque threshold for the fastener.

3. The apparatus of claim 2 wherein said nonvolatile, writable memory for storing said performance history is a radiation tolerant EEPROM capable of being spaceflight qualified.

4. The apparatus of claim 3 wherein said selection controls comprise controls for selecting between ratchet and motorized operation of the tool, selecting a speed direction and revolution per minute value for operation of the tool; and for selecting several combinations of torque and a number of revolutions to be applied or degree angle not to be exceeded.

5. The apparatus of claim 4 wherein said display indicators comprise an alphnumeric display located externally on said housing for displaying various parameter values and messages to the operator; and indicator lights located on the exterior of the housing to alert the operator to various conditions of the tool's operation.

6. A computer-implemented method for controlling and diagnosing torque and speed applied to fasteners by a hand-held tool and for monitoring operating parameters of the tool, comprising the steps of:

(a) monitoring the operating parameters of the hand-held tool comprising a housing with a hand-grip portion, an electric motor contained within said housing having a shaft, said motor being operable in current mode to control a force to be applied to a fastener interface mechanism connected to the shaft by varying current through the windings, a power supply for driving said motor and a circuit breaker for controlling the current to the motor;

(b) creating a performance history of the tool's operation comprising performance records to be stored in a nonvolatile, writable memory;

(c) controlling the torque and speed applied to fasteners by a program controlled processor having a clock for generating timing pulses and a first communications port for linking to a remote computer;

(d) providing a remote computer with a graphical user interface for analyzing at the remote computer torque, speed and parameter information;

(e) remotely directing the torque and speed to be applied to each of said fasteners by the hand held tool under the control of the remote computer.

7. The method of claim 6 wherein said operating parameters comprise temperatures, a motor current level, a power supply voltage level, and integrity of the nonvolatile memory containing a computer program and data.

8. The method of claim 7 wherein monitoring the operating parameters comprising temperatures, a motor current level, and a power supply voltage level comprises the following substeps of step (a):

(a1) upon a periodic timing pulse from said clock, said processor receiving digital values of the operating parameters that have been stored in a memory location of a random access memory;

(a2) determining whether the digital value is within an accepted tolerance range stored in a nonvolatile memory;

(a3) obtaining an indication of the integrity of the computer code and data stored in the nonvolatile, writable memory; and (a4) storing the digital value and the indication of substep (a3) in a performance record stored in the random access memory.

9. The method of claim 8 wherein said digital value is not within the accepted tolerance range so that step (a) further comprises the following substeps:

(a5) illuminating a fault indicator light located on the exterior of the housing;

(a6) displaying a message on an alphanumeric display located on the exterior of the housing for alerting the operator one of the operating parameters is not within its accepted tolerance range; and (a7) putting the tool in an appropriate safe state.

10. The method of claim 9 further comprising the following substeps:

(a8) upon a periodic timing pulse from said clock, said processor receiving digital values of the operating parameters that have been stored in a memory location of a random access memory;

(a9) determining whether the digital value is within an accepted tolerance range stored in a nonvolatile memory; and (a10) removing the tool from the appropriate safe state.

11. The method of claim 7 wherein monitoring the operating parameter of the integrity of the nonvolatile memory containing a computer program and data comprises the following substeps of step (a):

repeatedly performing a checksum calculation test on the nonvolatile memory; and resetting unused memory with single-byte opcodes.

12. The method of claim 11 wherein substep (a3) further comprises the substep of:

entering a self test fail state upon failure of the checksum test which may only be exited upon cycling power to the tool.

13. The method of claim 11 wherein substep (a3) further comprises the substep of:

returning to an idling state upon success of the checksum test.

14. The method of claim 6 wherein step (c) comprises the following substeps:

(c1) sending a communication signal from second communications port of the remote computer to the first communications port of the processor signifying that the remote computer seeks to download data to the nonvolatile, writable memory of the hand-held tool;

(c2) sending a ready signal from the first communications port of the processor to the second communications port of the remote computer;

(c3) upon receipt of the ready signal, transmitting from a permanent memory of the remote computer to the nonvolatile, writable memory of the hand-held tool programmed torque, the torque threshold, torque angle, turns count and turns count direction for each fastener.

15. The method of claim 14 further comprising the following substeps:

(c4) said processor receiving a signal that the tool is in a running state from a trigger located on the exterior of the housing for switching the tool between a running state and an idling state;

(c5) receiving a digital value representing a torque value sensed by a torque transducer responsive to the force being applied to a fastener interface mechanism by the shaft of the electric motor having an output capable of being transferred as a digital value to the processor;

(c6) said processor calculating an actual torque using the digital value;

(c7) said processor calculating the turns count achieved since the tool entered a running state based on a boxcar averaging algorithm of a number of motor shaft turns represented by a finite number of digital electronic pulses generated by electronics connected to the motor's shaft;

(c7a) said processor incrementing a total turns count since the tool was assembled;

(c8) comparing calculated torque to the programmed torque;

(c9) saving to next empty performance record in the random access memory the calculated torque, calculated turns count, and time for calculated torques that exceed a torque threshold stored in the nonvolatile, writable memory of the tool for the fastener;

(c10) verifying that motor current corresponds with the torque being generated;

(c11) stalling the motor upon achieving programmed torque until said trigger switches the tool to an idling state;

(c12) displaying on the alphanumeric display the programmed torque, a programmed speed, a maximum number of turns, and a number of output revolutions during the tool's operation in the running state.

16. The method of claim 15 wherein the substeps of step (c) are repeated on a periodic basis.

17. The method claim 6 wherein step (b) comprises the following substeps:

(b1) copying performance records stored in one of at least two random access memory locations to a separate memory location contained within the housing of the tool and connected to the processor while continuing to save performance records to another random access memory location to prevent the loss of any data performance records;

(b2) upon the tool exiting a running state, selecting a number of performance records containing torque, turns count and time data for a finite set from all such records stored in the separate memory wherein for a previous running state of the tool, said finite set includes a record with the data for the first time the torque threshold was achieved, a record containing a peak torque achieved, and additional records containing predetermined turns count ratios based on the turns count between the time the torque threshold was achieved and the peak torque achieved; and (b3) storing the finite set in the performance history in nonvolatile memory.

18. The method of claim 15 wherein the finite set contains five performance records having the record containing the data for the first time the torque threshold was achieved, the record containing the peak torque achieved, a record containing the data whose turns count value is one-quarter the turns count difference between the first and fifth data points, a record containing the data whose turns count value is one-half the turns count difference between the first and fifth data points, and a record containing the data whose turns count value is three-quarters the turns count difference between the first and fifth data points.

19. The method of claim 17 wherein the substeps (b1) and (b2) are performed on a periodic basis and the substep of (b3) is performed in part over several periods to prevent loss of data.

20. The method of claim 18 wherein the substeps (b1) and (b2) are performed on a periodic basis of five milliseconds period and the substep of (b3) is performed in part over several periods to prevent loss of data.

* * * * *

UNITED STATES PATENT AND TRADEMARK OFFICE
CERTIFICATE OF CORRECTION

PATENT NO. : 5,903,462
DATED : May 11, 1999
INVENTOR(S) : Wagner, et al

It is certified that error appears in the above-identified patent and that said Letters Patent is hereby corrected as shown below:

On the title page,
    Please change item {75} to read as follows:

Kenneth W. Wagner, James C. Taylor and Paul W. Richards

Signed and Sealed this

First Day of February, 2000

*Attest:*

Q. TODD DICKINSON

*Attesting Officer*     *Acting Commissioner of Patents and Trademarks*